US007028430B2

(12) United States Patent
Gironda

(10) Patent No.: US 7,028,430 B2
(45) Date of Patent: Apr. 18, 2006

(54) VARIABLE WEIGHT DIAMOND JIG FISHING LURE

(76) Inventor: William Gironda, 55 Leonard St., Wading River, NY (US) 11792

( * ) Notice: Subject to any disclaimer, the term of this patent is extended or adjusted under 35 U.S.C. 154(b) by 0 days.

(21) Appl. No.: 11/025,067

(22) Filed: Dec. 30, 2004

(65) Prior Publication Data

US 2005/0279009 A1 Dec. 22, 2005

Related U.S. Application Data

(63) Continuation-in-part of application No. 10/867,708, filed on Jun. 16, 2004, now Pat. No. 6,904,712.

(51) Int. Cl.
*A01K 85/14* (2006.01)
*A01K 85/00* (2006.01)

(52) U.S. Cl. .................... 43/42.22; 43/42.39; 43/42.35

(58) Field of Classification Search ............... 43/42.22, 43/42.39, 42.09, 42.35, 42.5, 42.06, 41, 41.2
See application file for complete search history.

(56) References Cited

U.S. PATENT DOCUMENTS

| | | | | | |
|---|---|---|---|---|---|
| 115,434 | A | * | 5/1871 | Chapman | 43/42.06 |
| 849,367 | A | * | 4/1907 | Burke | 43/42.22 |
| 1,569,993 | A | * | 1/1926 | Macleod | 43/42.39 |
| 1,608,375 | A | * | 11/1926 | Dewey | 43/42.32 |
| 1,913,362 | A | * | 6/1933 | Catarau | 43/42.06 |
| 1,960,488 | A | * | 5/1934 | Gray | 43/43.39 |
| 1,986,282 | A | * | 1/1935 | Parker | 43/42.39 |
| 1,993,798 | A | * | 3/1935 | Peterson | 43/42.22 |
| 2,003,976 | A | * | 6/1935 | Raymond | 43/42.09 |
| 2,065,246 | A | * | 12/1936 | Saarinen | 43/42.5 |
| 2,203,473 | A | * | 6/1940 | Shannon | 43/42.06 |
| 2,205,472 | A | * | 6/1940 | Fagerholm | 43/41 |
| 2,302,206 | A | * | 11/1942 | Gibson et al. | 43/41 |
| 2,487,344 | A | * | 11/1949 | Lambert | 43/41 |
| 2,507,772 | A | * | 5/1950 | Cummins | 43/42.09 |
| 2,568,488 | A | * | 9/1951 | Cummins | 43/42.09 |
| 2,632,276 | A | * | 3/1953 | Hale | 43/42.06 |
| 2,633,659 | A | * | 4/1953 | Baum | 43/42.22 |
| 2,644,265 | A | * | 7/1953 | Stettner | 43/42.06 |
| 2,703,947 | A | * | 3/1955 | Petrasek et al. | 43/42.39 |
| 2,706,359 | A | * | 4/1955 | Beames | 43/42.09 |
| 2,706,867 | A | * | 4/1955 | Ayres | 43/42.09 |
| 2,728,160 | A | * | 12/1955 | Franklin | 43/42.09 |
| 2,735,209 | A | * | 2/1956 | Faulkner | 43/42.35 |
| 2,740,224 | A | * | 4/1956 | Heiderich | 43/41 |
| 2,764,834 | A | * | 10/1956 | Klein | 43/42.09 |

(Continued)

FOREIGN PATENT DOCUMENTS

JP 2003-325079 A * 11/2003

(Continued)

*Primary Examiner*—Darren W. Ark
(74) *Attorney, Agent, or Firm*—Richard C. Litman

(57) ABSTRACT

The variable weight diamond jig fishing lure has a jig body with an elongated diamond shape, having a greater length than width, with eyes formed into the opposing longitudinal ends for attachment to a fishing line and a fishhook, respectively. The jig body is formed from two symmetrical plates having their central portions stamped, molded, or otherwise formed outward to form a central chamber or cavity for receiving a weight or ballast. Slots are formed in the plates between the cavity and the eye. A lock plate having an eye defined in one end and a lock tab attached by a tang depending from the opposite end are inserted through the slots and rotated to lock opposing ends of the jig body together.

2 Claims, 9 Drawing Sheets

U.S. PATENT DOCUMENTS

| | | | | | |
|---|---|---|---|---|---|
| 2,796,693 | A | * | 6/1957 | Gunterman | 43/42.09 |
| 2,888,771 | A | * | 6/1959 | Stephens et al. | 43/41.2 |
| 2,909,863 | A | * | 10/1959 | Rector et al. | 43/42.39 |
| 2,910,798 | A | * | 11/1959 | Bias | 43/41.2 |
| 2,914,883 | A | * | 12/1959 | Kustusch | 43/41.2 |
| 3,087,273 | A | * | 4/1963 | Udo | 43/42.06 |
| 3,169,337 | A | * | 2/1965 | McGregor | 43/42.09 |
| 3,170,263 | A | * | 2/1965 | Purdy | 43/42.5 |
| 3,190,028 | A | * | 6/1965 | Mambrin | 43/41.2 |
| 3,273,277 | A | * | 9/1966 | Valentine | 43/41 |
| 3,460,285 | A | * | 8/1969 | Perkins | 43/42.35 |
| 3,675,358 | A | * | 7/1972 | Jones | 43/42.09 |
| 3,748,772 | A | * | 7/1973 | Gravitt | 43/41 |
| 3,896,580 | A | * | 7/1975 | Williams | 43/42.06 |
| 3,913,257 | A | * | 10/1975 | Colgan | 43/42.09 |
| 4,047,317 | A | * | 9/1977 | Pfister | 43/42.06 |
| 4,155,192 | A | * | 5/1979 | Varaney | 43/42.5 |
| 4,442,622 | A | * | 4/1984 | Sartain | 43/42.06 |
| 4,553,348 | A | * | 11/1985 | Cooper | 43/42.06 |
| 4,637,160 | A | * | 1/1987 | Biskup | 43/42.5 |
| 4,700,503 | A | * | 10/1987 | Pippert | 43/42.09 |
| 4,777,756 | A | * | 10/1988 | Mattison | 43/42.06 |
| 4,800,670 | A | * | 1/1989 | Mattison | 43/42.06 |
| 4,839,983 | A | * | 6/1989 | Pippert | 43/42.06 |
| 5,150,538 | A | * | 9/1992 | Buchanan | 43/42.39 |
| 5,414,952 | A | * | 5/1995 | McLaughlin | 43/42.5 |
| 5,490,346 | A | * | 2/1996 | Guest | 43/42.09 |
| 5,648,121 | A | * | 7/1997 | Cornell et al. | 43/42.39 |
| 5,862,623 | A | * | 1/1999 | MacPherson | 43/42.06 |
| 5,890,315 | A | * | 4/1999 | Norton | 43/42.31 |
| 6,158,161 | A | * | 12/2000 | Rossman | 43/42.06 |
| 6,202,337 | B1 | | 3/2001 | Yoshida | |
| 6,301,823 | B1 | * | 10/2001 | Monticello et al. | 43/42.5 |
| 6,349,498 | B1 | * | 2/2002 | Garratt | 43/42.06 |
| 6,581,320 | B1 | | 6/2003 | Hnizdor | |
| 6,581,321 | B1 | * | 6/2003 | Tashchyan | 43/42.39 |
| 6,606,815 | B1 | * | 8/2003 | Toris | 43/42.09 |
| 6,675,525 | B1 | | 1/2004 | Ford | |
| 6,904,712 | B1 | * | 6/2005 | Gironda | 43/42.22 |
| 2002/0174592 | A1 | | 11/2002 | Wright | |
| 2003/0074830 | A1 | * | 4/2003 | Goeke | 43/42.39 |
| 2005/0028423 | A1 | * | 2/2005 | Kaariainen et al. | 43/42.5 |

FOREIGN PATENT DOCUMENTS

| | | | | | |
|---|---|---|---|---|---|
| JP | 2003-339277 | A | * | 12/2003 | |
| JP | 2004-16156 | A | * | 1/2004 | |
| JP | 2004-57099 | A | * | 2/2004 | |
| JP | 2004-73148 | A | * | 3/2004 | |
| JP | 2005-73664 | A | * | 3/2005 | |
| WO | WO-86/00499 | A1 | * | 1/1986 | 43/42.06 |

* cited by examiner

VARIABLE WEIGHT DIAMOND JIG FISHING LURE

CROSS-REFERENCE TO RELATED APPLICATIONS

This application is a continuation-in-part of application Ser. No. 10/867,708 filed Jun. 16, 2004, now U.S. Pat. No. 6,904,712 B1.

BACKGROUND OF THE INVENTION

1. Field of the Invention

The present invention relates to fishing lures, and more particularly to a diamond-shaped lure wherein weights for varying the lure's operating depth are easily changed.

2. Description of the Related Art

The diamond jig fishing lure is well known, as it approximates the size and shape of bait fish that would be the primary food source for the type of fish meant to be caught. The diamond jig lure is designed for jig fishing. Jig fishing is essentially fishing at or near the bottom of a body of water using a technique that involves a jiggling retrieval of the lure. Conventional jigs, or jigheads, comprise a lead weight molded onto the shank of a fishhook and painted or dressed to resemble bait in order to attract fish.

The diamond jig, e.g., the Bridgeport diamond jig, is essentially an elongated metal jig having an eye at one end for attachment to a fishing line and a second eye at the opposite end for attachment to a fishhook. The jig has the shape of an enlarged diamond, similar to the diamond suit in a deck of playing cards but elongated on the vertical axis, hence the resemblance to a diamond. The body of the diamond jig has two opposing diamond-shaped faces and two opposing edge faces. The jig may be flat, or may be thicker towards the middle of the jig. In addition, the jig may be rounded at the corners. The diamond jig has a predetermined weight built into the body of the lure to cause the lure to sink to the desired depth and to jig or wobble with the desired motion when the line is retrieved. The diamond jig was originally designed to simulate the appearance and movement of a sand eel. The diamond jig has been used successfully to fish for a wide variety of species of game fish, both in salt water and in fresh water. Diamond jigs are available in a variety of weights that are adapted for the particular game fish of interest. For example, such jigs are commonly available from one ounce up to sixteen ounces in weight, and there are some diamond jigs which weigh up to thirty-two ounces.

A problem that the fisherman has is that this requires a variety of diamond jigs of different weights to adjust to the species of fish and the nature of the water conditions. There is a need for a single diamond jig lure that is weight adjustable so that the weight of the lure can be easily adjusted by adding or subtracting ballast to the lure.

Several devices have been devised to adjust the buoyancy of different types of fishing lures. A number of these schemes involve changing the weights internally of the body of the lure. However, none of these devices have proved entirely satisfactory, and none disclose a variable weight diamond jig fishing lure as will subsequently be described and claimed in the instant invention. Thus, a variable weight diamond jig fishing lure solving the aforementioned problems is desired.

SUMMARY OF THE INVENTION

The variable weight diamond jig fishing lure has a jig body with an elongated diamond shape, having a greater length than width, with eyes formed into the opposing longitudinal ends for attachment to a fishing line and a fishhook, respectively. The jig body is formed from two symmetrical plates having their central portions stamped outward to form a central chamber or cavity for receiving a weight or ballast. Slots are formed in the plates between the cavity and the eye. A lock plate having an eye defined in one end and a lock tab attached by a tang depending from the opposite end are inserted through the slots and rotated to lock opposing ends of the jig body together.

The lure may be assembled from the jig using any desired leader and hook configuration. A preferred embodiment includes either a single or a treble fishhook attached to one end by a split ring, and a snap swivel attached to a leader line or directly to the fishing line at the opposite end. The weight placed in the cavity may be any desired weight or sinker (lead balls, BB's, etc.), but is preferably a bank sinker weighing between eight and twenty ounces. The plates comprising the jig body are preferably made from stainless steel, but could also be made from hot or cold rolled steel, copper, brass, plastics, fiberglass, etc.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
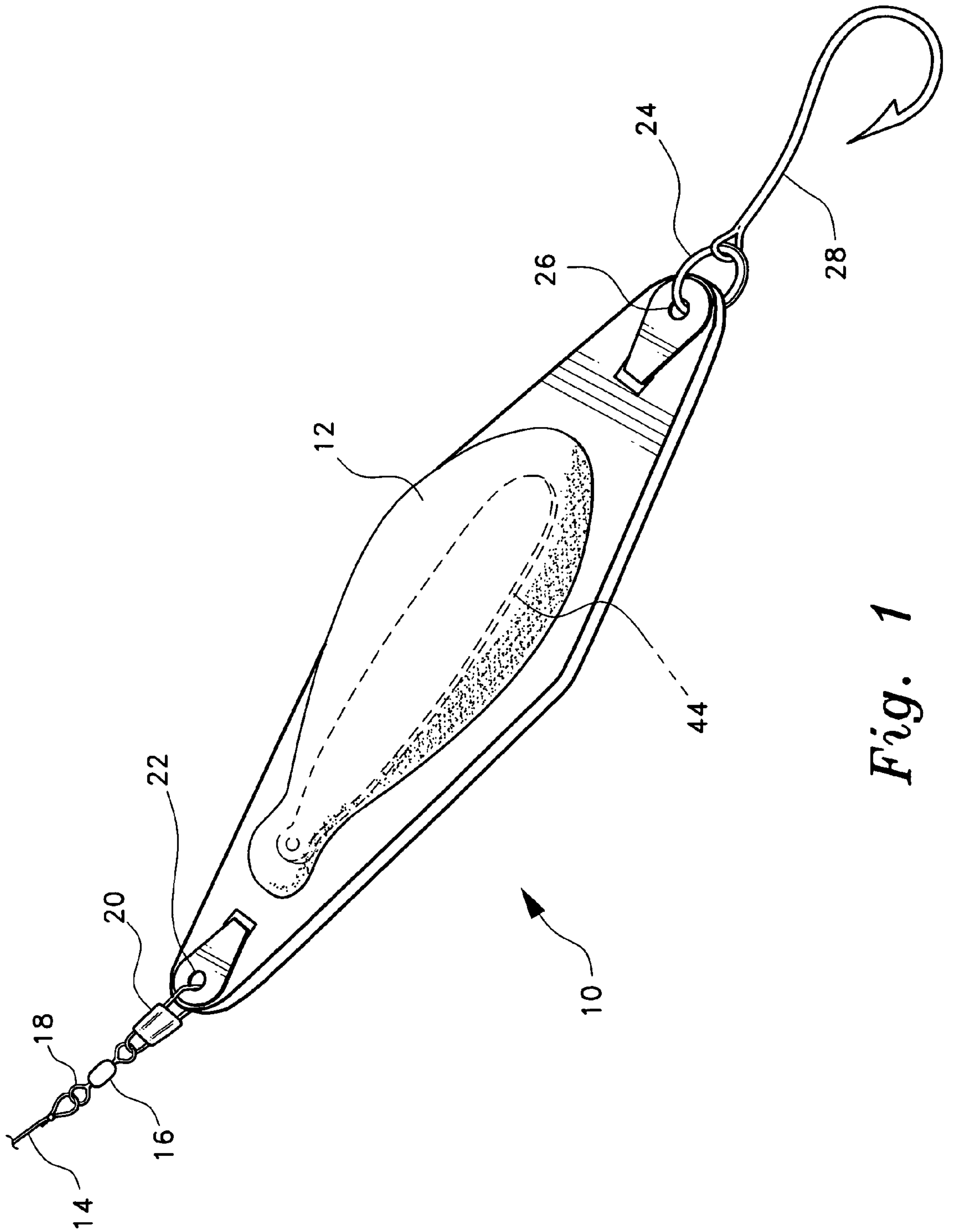
FIG. 1 is a perspective view of a first embodiment of a variable weight diamond jig fishing lure according to the present invention.

The present invention is a variable weight diamond fishing lure, designated generally as 10 in FIG. 1. The lure 10 is characterized by a generally diamond-shaped jig body 12, which body has a cavity defined therein for receiving a weight or other ballast. The body can be opened to replace the weight in order to vary the weight of the lure 10 to adjust the speed at which the weight sinks and the degree of wobble during retrieval of the lure according to the type of game fish targeted, and according to the depth, bottom conditions, current, and other environmental factors relating to the waters being fished.

The jig body 12 is elongated and has a first end adapted for attachment to a fishing line and a second end adapted for attachment to a fishhook. The lure may be assembled from the jig using any desired terminal tackle, including any desired leader and hook configuration. A preferred embodiment includes either a single or a treble fishhook attached to one end by a split ring, and a snap swivel attached to a leader line or directly to the fishing line at the opposite end. For example, FIG. 1 shows a fishing line 14 attached to a snap swivel 16. The line 14 is inserted through the swivel ring 18 and secured thereto by a knot, crimp, or other conventional means. The snap end 20 of the swivel 16 is inserted through an eye 22 formed in the end of the jig body 12, as described below. A stainless steel split ring 24, a snap lock clip, or other connector is inserted through a second eye 26 formed in the opposite end of the jig body 12. A single fishhook 28 is secured to the ring 24 by inserting the split ring 24 or snap lock clip through the eye in the shank of the fishhook 28.

Figure 2A:
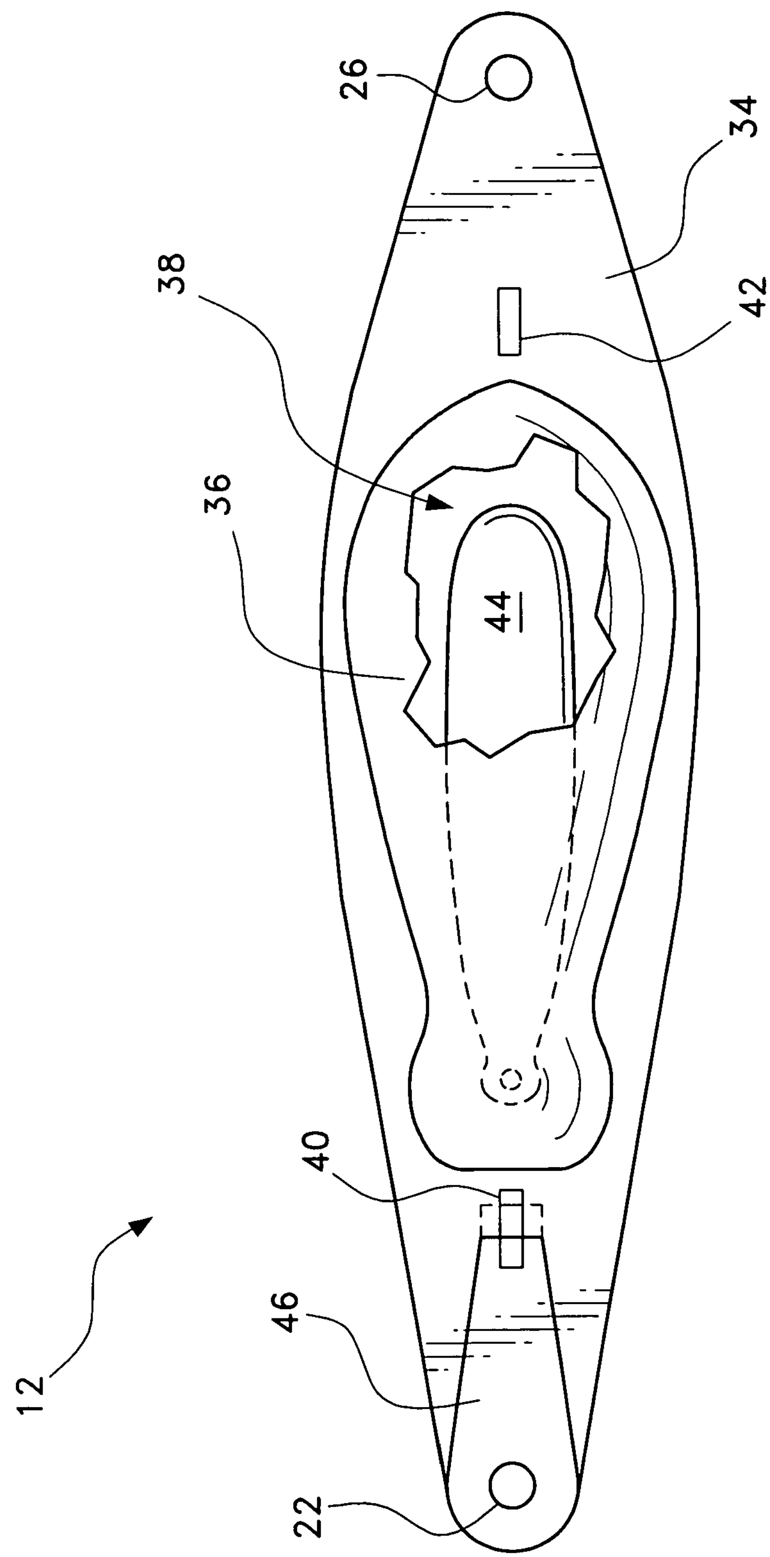
FIG. 2A is a plan view of a first embodiment of a variable weight diamond jig according to the present invention, the outer shell being partially broken away to show the weight in the cavity and a lock clip being omitted from the hook end of the jig.
Figure 3:
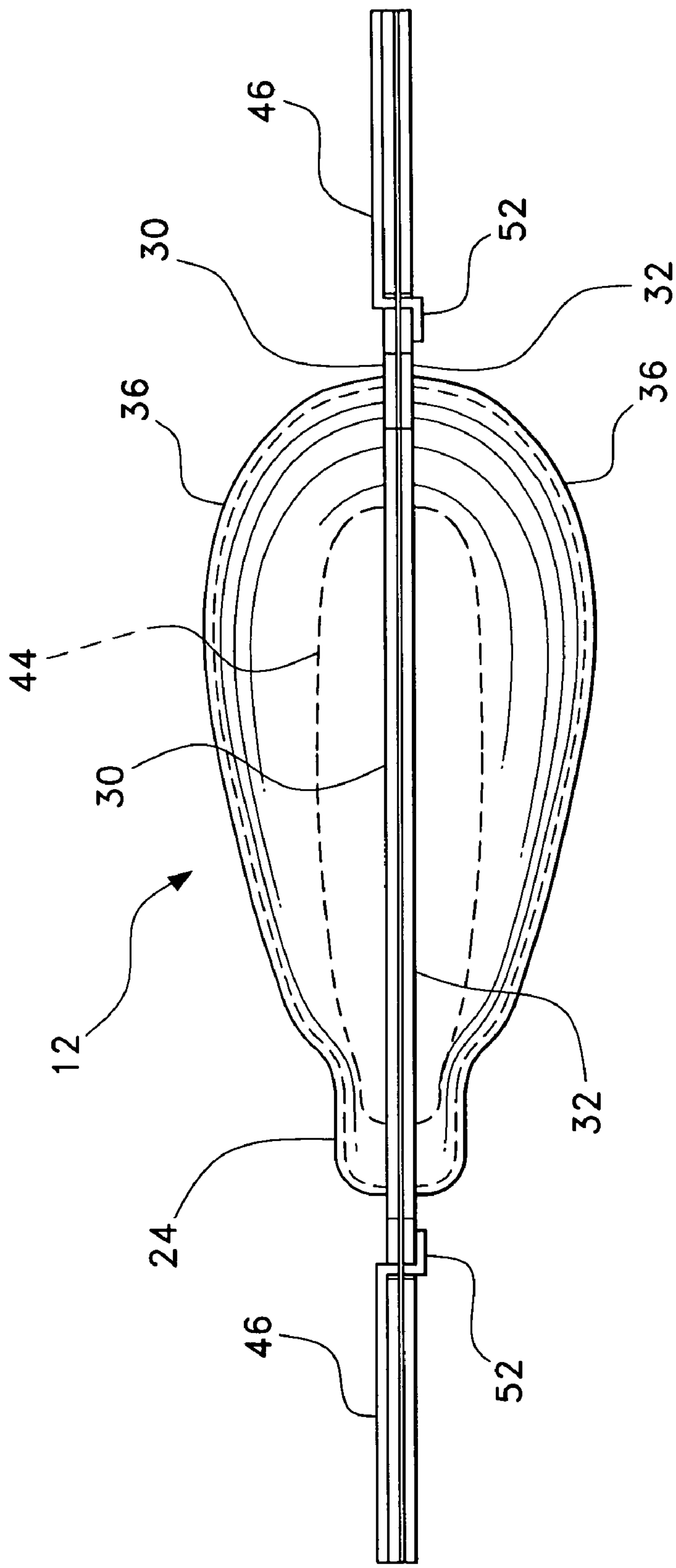
FIG. 3 is a side view of the variable weight diamond jig according to the present invention with both lock clips locked into place.

Referring to FIGS. 2A and 3, the jig body 12 made from two symmetrical plates 30 and 32, each plate having an elongated diamond shape with a flat periphery 34 and a half-shell central portion 36 defining a chamber or cavity 38. The central portion 36 may have the general outline of a fish. As noted above, the flat periphery 34 has eyes 22 and 26 defined in opposite ends of the plates 30 and 32. Each plate 30 and 32 also has a first elongate slot 40 defined therein between eye 22 and central portion 36, and a second elongate slot 42 defined between central portion 36 and eye 26.

The plates 30 and 32 are preferably made from stainless steel, but could also be made from hot or cold rolled steel, copper, brass, plastics, fiberglass, etc. The half-shell central portions 36 defining the cavity 38 may be formed by stamping the plates 30 and 32, by casting the plates in a mold, by injection molding, or by other processes. Representative dimensions for the plates 30 and 32 may include an overall length of about eight inches and a width at the center of about two inches. The central portion 36 defining the cavity 38 may have an overall length of about 4⅛", a width of about 1⅝" at its broadest point and ⅞" at the "tail" of the fish-shaped cavity 38, and a maximum height or depth of about 1" in each half-shell 36, and a height or depth in the fish "tail" portion of the cavity of about ¼", the fish tail portion being about ¾" long. The ends of the central portion 36 are about 1 15/16 inches from the ends of the plates 30 and 32. The eyes 22 and 26 may have a diameter of about ¼", the slots 40 and 42 having a length of about ⅜" and a width of about ⅛". It will be understood that the above dimensions are only representative dimensions, and actual dimensions may vary.

A ballast or weight is disposed within the cavity 38. The weight placed in the cavity may be any desired weight or sinker (lead balls, BB's, etc.), but is preferably a bank sinker 44, as shown in FIGS. 2A and 3. The bank sinker 44 preferably weighs between eight and twenty ounces. Although a plurality of discrete weights could be used, the plurality of weights may have a tendency to shift around and become separated at opposite ends and sides of the cavity, affecting the wobbling motion of the lure 10 during retrieval. Bank sinkers generally have an hourglass shape, and are commonly available in one ounce increments in the desired range from eight to twenty ounces, making adjusting the weight of the jig 12 a simple matter of removing a single weight and replacing it with a single weight. Also, the shape of the bank sinker 44 places the center of gravity towards the hook end of the lure 10 to promote rapid descent to the bottom, and imparting a desired wobble to the swivel 16 upon jigging or retrieving the line 14.

Figure 2B:
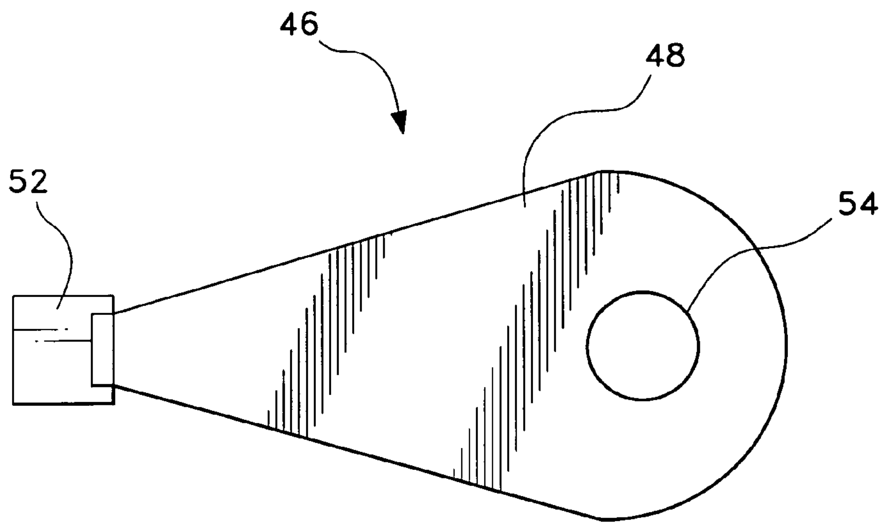
FIG. 2B is a plan view of a lock clip used for the variable weight diamond jig according to the present invention.
Figure 2C:
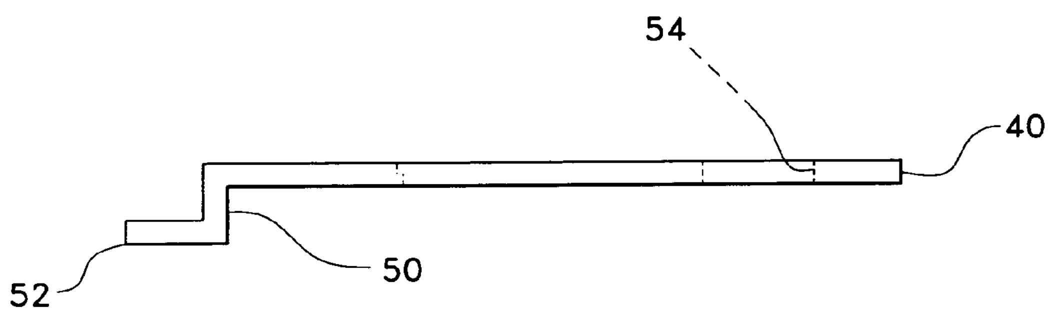
FIG. 2C is a side view of a lock clip used for the variable weight diamond jig according to the present invention.

The diamond jig 12 includes a pair of lock clips 46, shown in FIGS. 2B and 2C, for releasably locking the plates 30 and 32 together. Each clip 46 has a flat, teardrop shaped body 48, a tang 50 depending or projecting downwardly from the body 48 at an angle of about 90°, and a rectangular tab 52 extending from the tang 50 at an angle of about 90°, the tab 52 being parallel to the body 48 but extending 180° opposite the body 48. There may be a fillet at the junctions between body 48 and tang 50, and between tang 50 and tab 52, in order to ease assembly of the jig 12, or tang 50 may be slightly canted away from body 48 and tab 52 for the same purpose. Each clip 46 has an eye 54 defined therein opposite the tang, the eye 54 having the same diameter as eyes 22 and 26. Each tab 52 has a width slightly smaller than the length of the slots 40 and 42, and a thickness slightly smaller than the width of slots 40 and 42. Each tang 50 has a thickness and a width slightly less than the width of slots 40 and 42, and a length slightly greater than the combined thickness of plates 30 and 32.

Figure 2D:
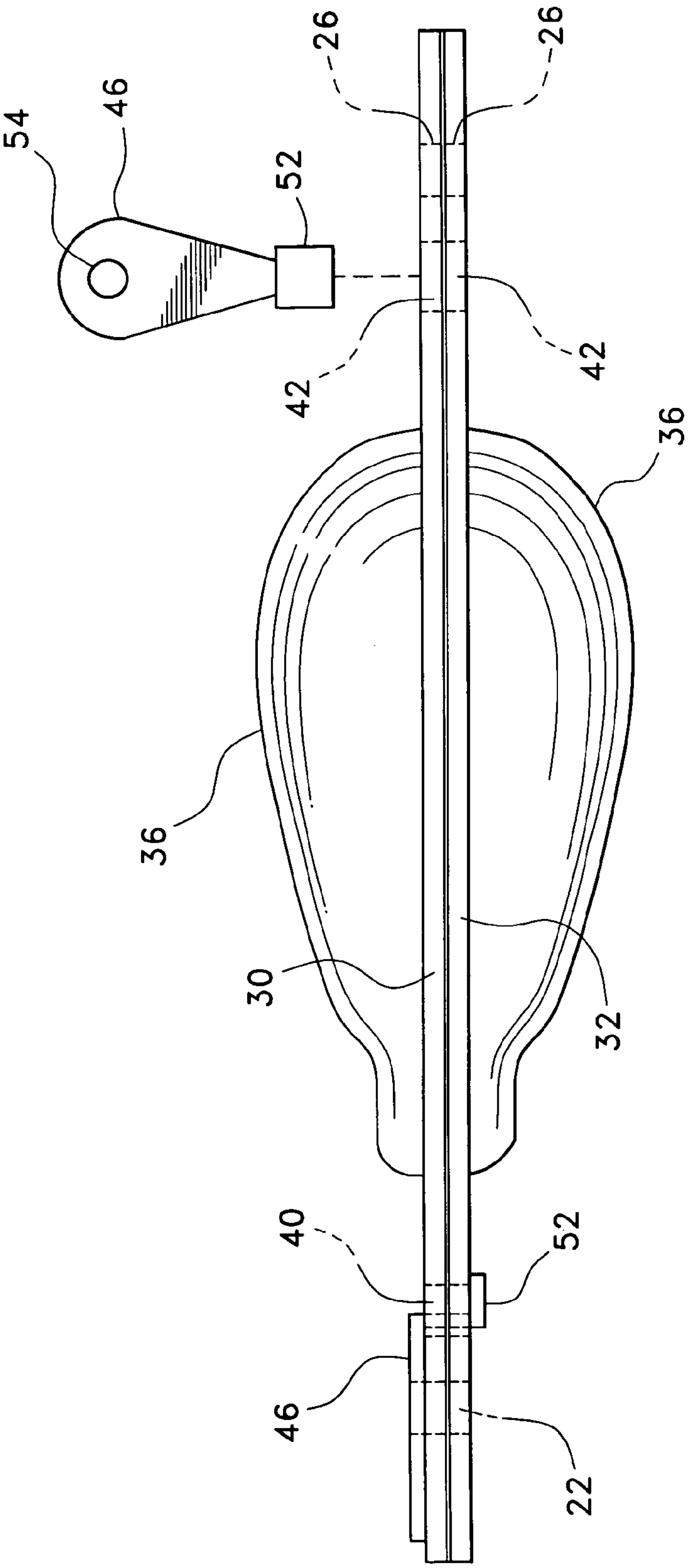
FIG. 2D is an exploded elevation view showing the process of inserting the lock clip into the variable weight diamond jig according to the present invention.
Figure 2E:
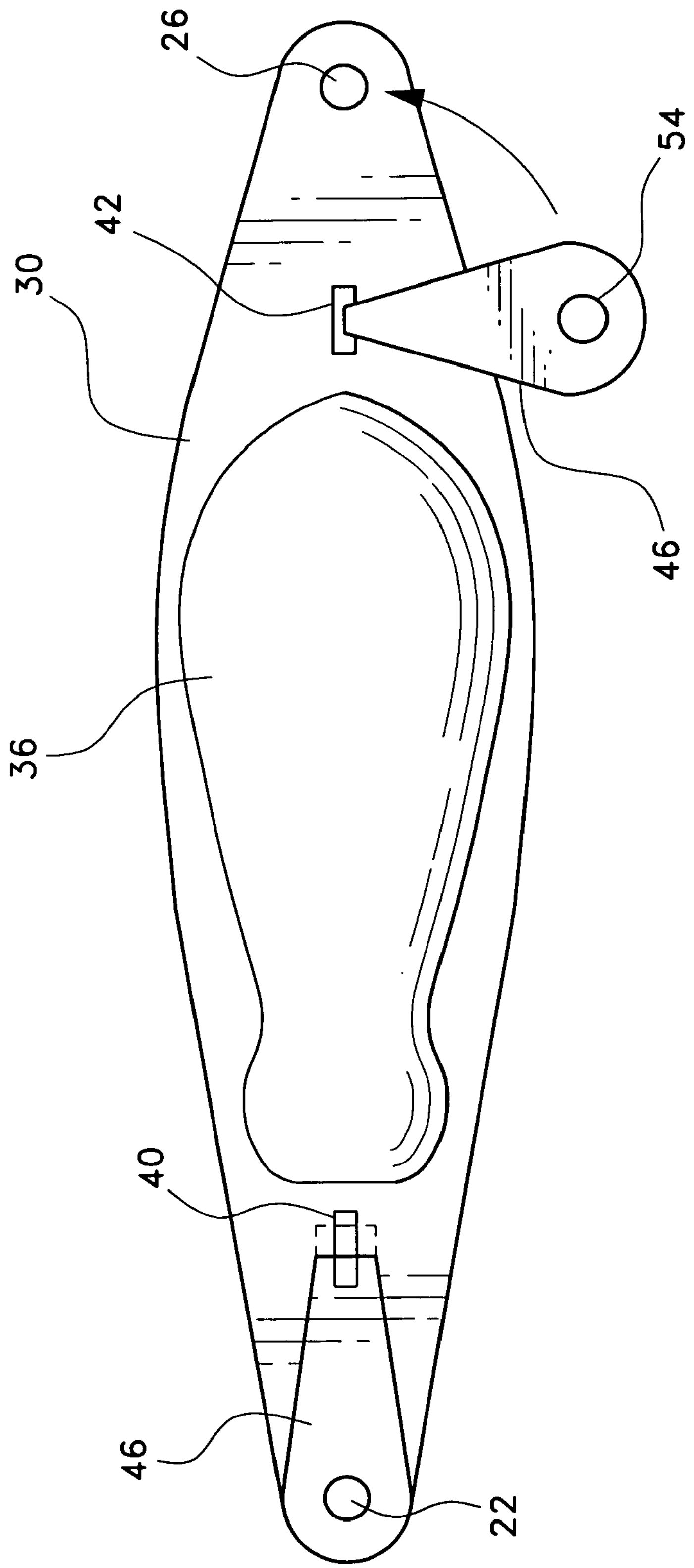
FIG. 2E is a plan view of the variable weight diamond jig according to the present invention with the lock clip tab inserted into the slot, but before rotation of the lock clip.
Figure 4:
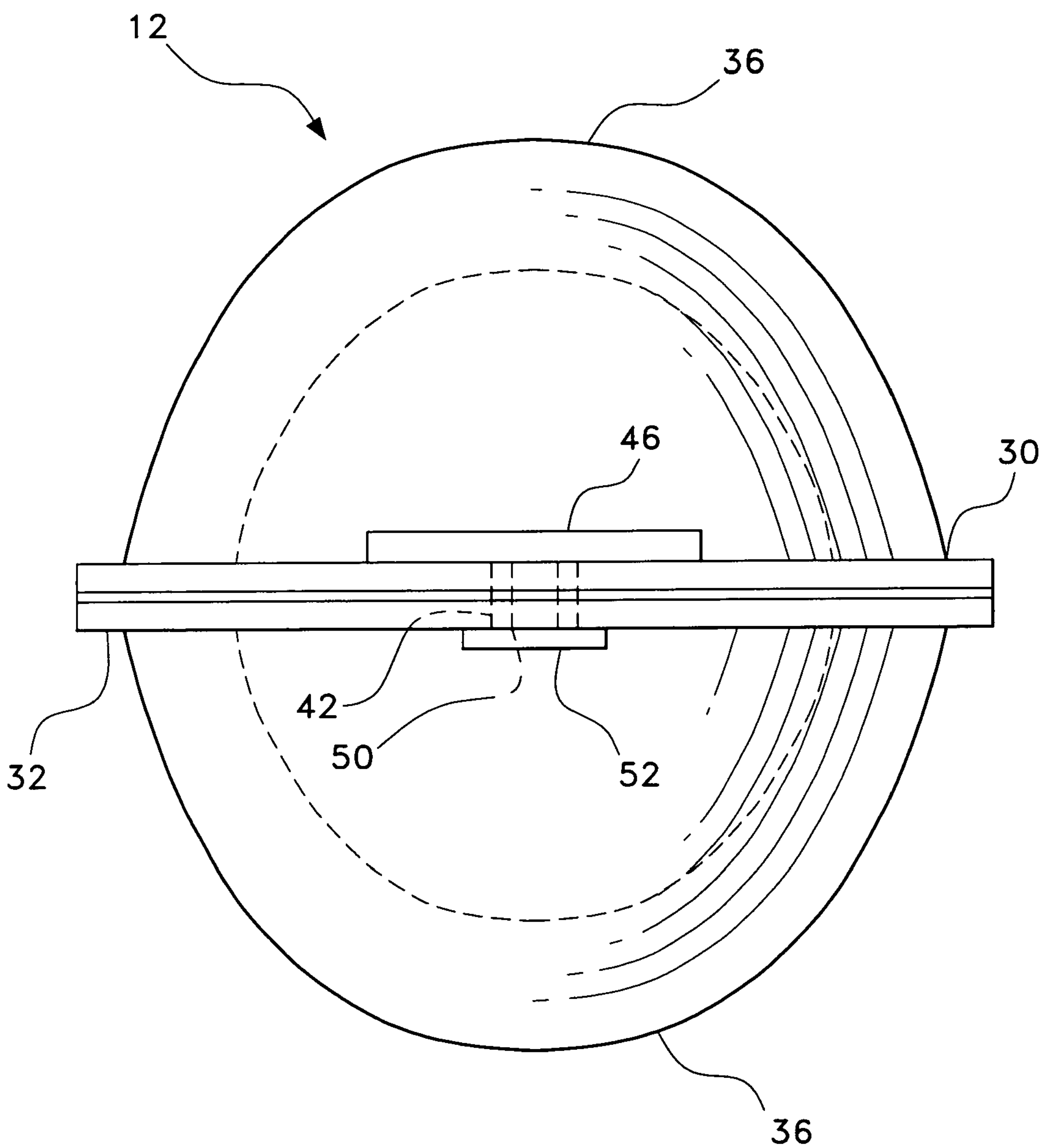
FIG. 4 is an end view of a first embodiment of the variable weight diamond jig according to the present invention.

As shown in FIGS. 2D and 2E, the plates 30 and 32 are abutted together so that central portions 36 form cavity 38, the eyes 22 and 26 and slots 40 and 42 of the two plates 30 and 32 being in registry. The clip 46 is oriented perpendicular to the plates 30 and 32 so that the leading edge of the tab 52 is aligned with the slot 40 or 42 and inserted therethrough and the clip 46 is rotated vertically 90° until body 48 is parallel with plates 30 and 32, tab 52 is under and parallel to plate 32, and tang 50 extends through the slot 40 or 42. Clip 46 is then rotated 90° horizontally to align eye 54 with either eye 22 or eye 26. As shown in FIGS. 3 and 4, plates 30 and 32 are then clamped together between the clip body 48 and tab 52.

When it is desired to vary the weight of the diamond jig 12, the clip 46 is rotated 90° horizontally and again 90° vertically, and tab 52 is removed from slot 40 or 42. After both lock clips 46 have been removed, the bank sinker 44 is removed and replaced with a bank sinker 44 of the desired weight, and the lock clips are reinstalled. Hence the variable weight diamond jig 12 and lure 10 of the present invention provide the fishermen with a single diamond lure whose weight can be varied quickly and easily to adjust to the desired species of game fish and the conditions of the body of water being fished.

Figure 5:
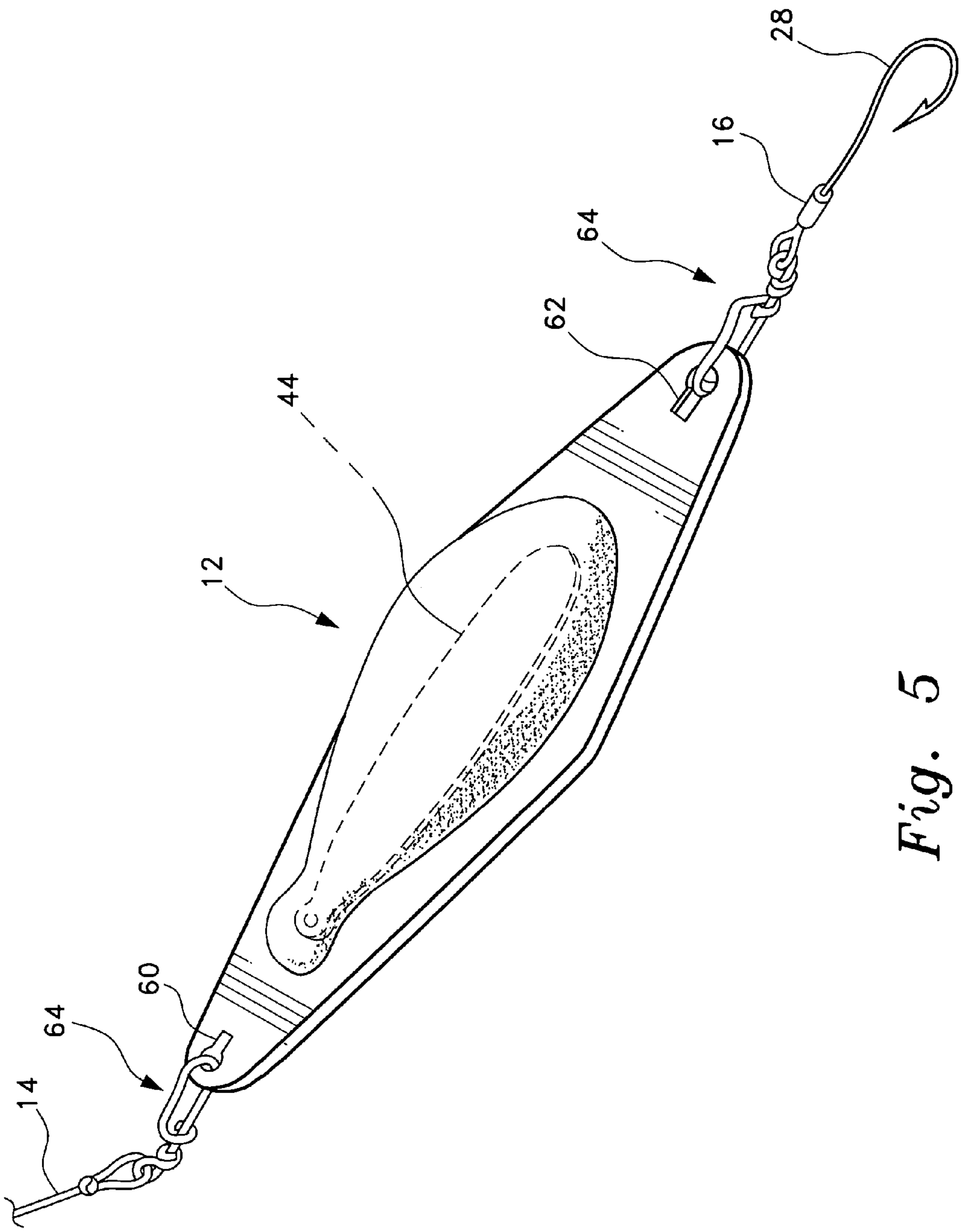
FIG. 5 is a perspective view of a second embodiment of a variable weight diamond jig fishing lure according to the present invention.
Figure 6:
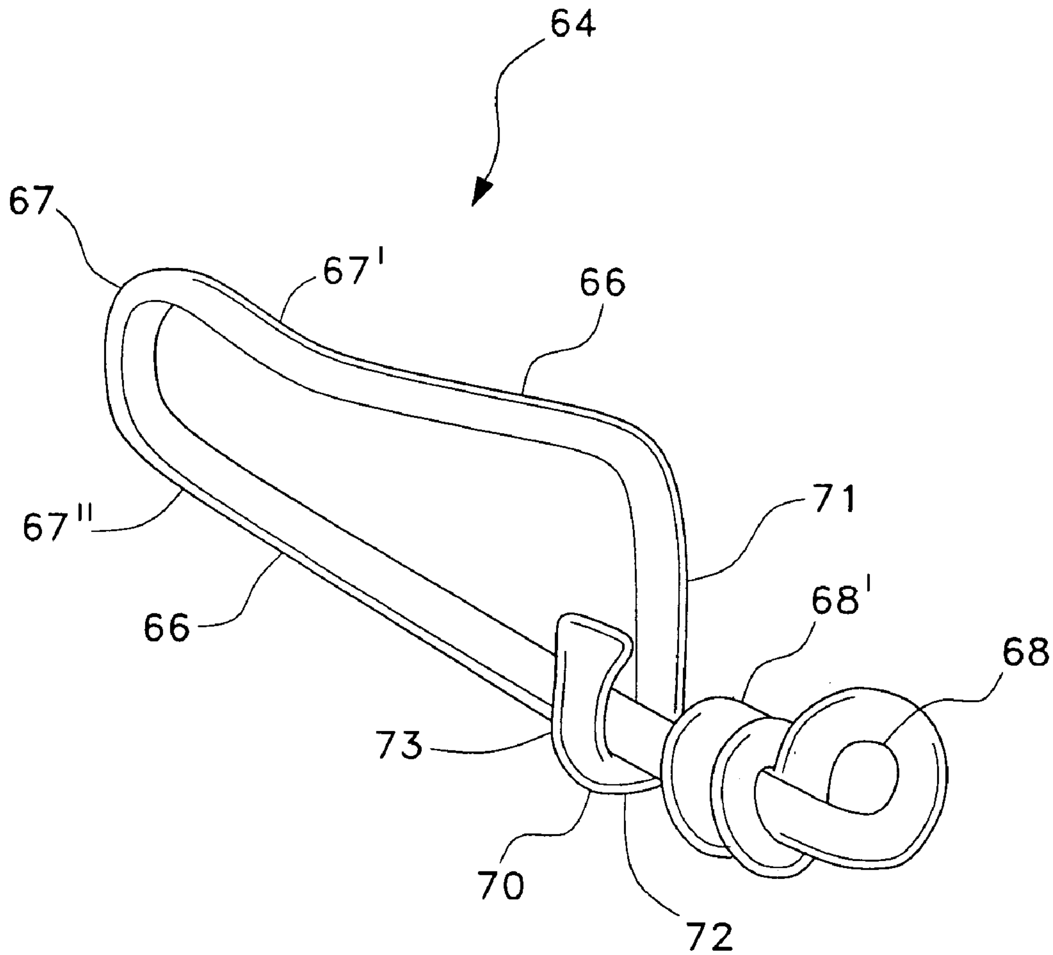
FIG. 6 is a perspective view of a lock clip utilized with a second embodiment of a variable weight diamond jig fishing lure according to the present invention.

FIGS. 5 and 6 are illustrative of a second embodiment of the invention wherein keyhole slots 60 and 62 are formed through the respective ends of jig body 12. A lock snap 64 is inserted in each slot 60, 62 to secure the plates of the jig body together and to provide means for attaching swivel connection 16 and hook 28 at one end and line 14 at the other end. As best seen in FIG. 6, lock snap 64 comprises a body fabricated from one-piece continuous spring wire and functions in a manner similar to a safety pin. Shaft portion 66 defines the body of lock snap 64. Each lock snap 64 has an eyelet 68 defined at a first end, a U-shaped bend 67 at a second end, and a U-shaped portion 70 at an intermediate extent thereof, wherein the U-shaped bend 67 has upper 67' and lower 67" legs extending therefrom which are opposed to each other. Shaft portion 66 terminates in a first end that is defined as the eyelet 68, wherein the first end of the shaft portion 66 is wrapped 68' about a portion of the lower leg 67" oppositely of the eyelet 68 so as to define the eyelet 68. The second end of the lock snap is defined as the U-shaped portion 70, wherein the second end of the shaft portion 66 has a first section 71 that extends downwardly from the upper leg 67' along one side of the lower leg 67", a second section 72 that extends from the first section transversely under the lower leg 67", and a third section 73 that extends upwardly from the second section on an other side of the lower leg 67" opposite the first section so as to form the U-shaped portion 70. U-shaped portion 70 can be disengaged from shaft 66 when it is desired to replace bank sinker 44.

It is to be understood that the present invention is not limited to the embodiment described above, but encompasses any and all embodiments within the scope of the following claims.

I claim:

1. A variable weight diamond jig comprising:

first and second symmetrical plates, each of the plates having an elongated diamond shape and opposing longitudinal ends, each of the plates having a flat periphery and a central portion defining a half-shell, the two half-shells defining a cavity when the two plates are abutted and in registry, each of the plates having a first keyhole slot defined in the flat periphery at one of the opposing longitudinal ends and a second keyhole slot defined in the flat periphery at an other of the opposing longitudinal ends;

a first spring-wire snap lock and a second spring-wire snap lock removably inserted in the first and second slots, respectively, each of the snap locks having an eyelet defined at a first end, a U-shaped bend at a second end, and a U-shaped portion at an intermediate extent thereof, wherein the U-shaped bend has upper and lower legs extending therefrom which are opposed to each other, each of the snap locks comprising a shaft member, each said shaft member terminating in a first end defining the eyelet and a second end terminating in the U-shaped portion, the first end of the shaft portion being wrapped about a portion of the lower leg oppositely of the eyelet so as to define the eyelet, the second end of the shaft portion has a first section that extends downwardly from the upper leg along one side of the lower leg, a second section that extends from the first section transversely under the lower leg, and a third section that extends upwardly from the second section on an other side of the lower leg opposite the first section whereby the sections define the U-shaped portion, the flat periphery of the first and second plates being locked together in abutting relationship by the shaft member of each snap lock when the shaft members respectively extend through the first and second keyhole slots; and a ballast disposed within the cavity.

2. The variable weight diamond jig according to claim 1 wherein said ballast is a removable bank sinker.

* * * * *